(12) United States Patent
Whitmore

(10) Patent No.: US 6,634,282 B1
(45) Date of Patent: Oct. 21, 2003

(54) SANDWICH MACHINE

(76) Inventor: Henry B. Whitmore, 3650 S. Loop 1604 W-6, San Antonio, TX (US) 78264

( * ) Notice: Subject to any disclaimer, the term of this patent is extended or adjusted under 35 U.S.C. 154(b) by 0 days.

(21) Appl. No.: 09/511,675

(22) Filed: Feb. 23, 2000

(51) Int. Cl.[7] .................... A21C 15/00; B26D 1/15
(52) U.S. Cl. ............... 99/450.1; 99/537; 83/155; 83/403.1; 83/435.2; 83/492; 83/932
(58) Field of Search ................ 99/450.1–450.7, 99/537; 83/155, 151.1, 403.1, 435.2, 491–494, 543, 932; 426/518

(56) References Cited

U.S. PATENT DOCUMENTS

| | | | | |
|---|---|---|---|---|
| 1,825,205 A | * | 9/1931 | Reynoldson | |
| 4,075,917 A | * | 2/1978 | Kistner et al. | 83/422 |
| 4,246,837 A | * | 1/1981 | Chenery | 99/486 |
| 4,566,360 A | * | 1/1986 | Lehmann | 83/409 |
| 5,271,304 A | * | 12/1993 | Wygal et al. | 83/422 |
| 5,335,792 A | * | 8/1994 | Hauch | 209/687 |
| 5,875,697 A | * | 3/1999 | Cole et al. | 83/435.2 |
| 6,205,900 B1 | * | 3/2001 | Heck et al. | 83/551 |
| 6,415,698 B1 | * | 7/2002 | Haas et al. | 83/255 |
| 6,426,104 B1 | * | 7/2002 | Leitinger | 426/243 |

* cited by examiner

Primary Examiner—Drew Becker
(74) Attorney, Agent, or Firm—Paul H. Gallagher (57) ABSTRACT

An elongated frame made up of rails, and having a main endless belt conveyor for carrying parts of sandwiches, and completed sandwiches through the machine. A slicer carriage is mounted on and above the frame, having an endless slicer belt means parallel with the main belt for gripping the sandwiches between the belts for conveying them. The slicer belt means is made up of transversely spaced belts, forming a space therebetween, and a slicer blade is operable in the space between the belts. The main belt has a longitudinal groove in its outer surface, to receive the edge of the blade to enable the blade to cut entirely through the sandwiches and in slicing them. The slicing carriage, and the slicer blade, each individually, are vertically adjustable for accommodating sandwiches of different thickness.

7 Claims, 8 Drawing Sheets

SANDWICH MACHINE

FIELD OF THE INVENTION

The invention resides in the field of making sandwiches in an assembly line, and is directed particularly to a machine for use by operators to make the sandwiches.

SUMMARY OF THE INVENTION

The sandwich machine includes a main conveyor belt on which pieces are placed for use in making the sandwiches, and arranged for use by a number of operators for rapid production of the sandwiches.

A main feature is that the conveyor belt moves at a relatively rapid rate of speed, and the machine is so designed and built as to accommodate various pieces that make up the sandwiches, in convenient positions for the operators to pick up and place in sandwich form, and for positioning them for cutting them after they are formed.

Another feature is that the machine includes a slicer carriage or unit that also has conveyor belt means therein, and is arranged to cooperate with the main conveyor belt in the machine for gripping sandwiches and moving them along, and while they are being moved, to cut the sandwiches.

Another feature includes a novel cutting arrangement including a rotating slicer blade in the slicer unit. The sandwiches are gripped between the conveyor belts, and as the sandwiches are moved along, the rotating slicer blade cuts through the sandwiches, and in order to produce an accurate sandwich, the main conveyor belt is provided with a longitudinal groove in the center for accommodating the slicer blade so as to completely cut through the sandwiches without engaging or marring the main conveyor belt.

Driving and control means is provided for driving both conveyor belts at a synchronous linear speed so as to properly grip the sandwiches in the conveying step, and in the slicing step, so as to form accurate sandwiches.

The slicer carriage is adjustable for positioning it accurately relative to the main conveyor belt so as to produce firm gripping of the sandwiches, and the slicer blade within the slicer carriage is also adjustable for accommodating the movements of the slicer carriage, and thereby determining its own position relative to the sandwiches on the main conveyor.

Another feature is a novel construction of a frame for the sandwich machine for mounting the slicer carriage thereon and for enabling detachably mounting supply trays on the frame according to the positioning of the operators and the character of the contents making up the sandwiches.

Still another advantage is the provision of a frame for the sandwich machine that is solid, and although it is of relatively great dimensions, is so constructed so as to be supported on the floor which may be uneven, whereby to eliminate any twisting or cocking from irregularities in the supporting floor.

DETAILED DESCRIPTION OF THE DRAWINGS

Figure 1:
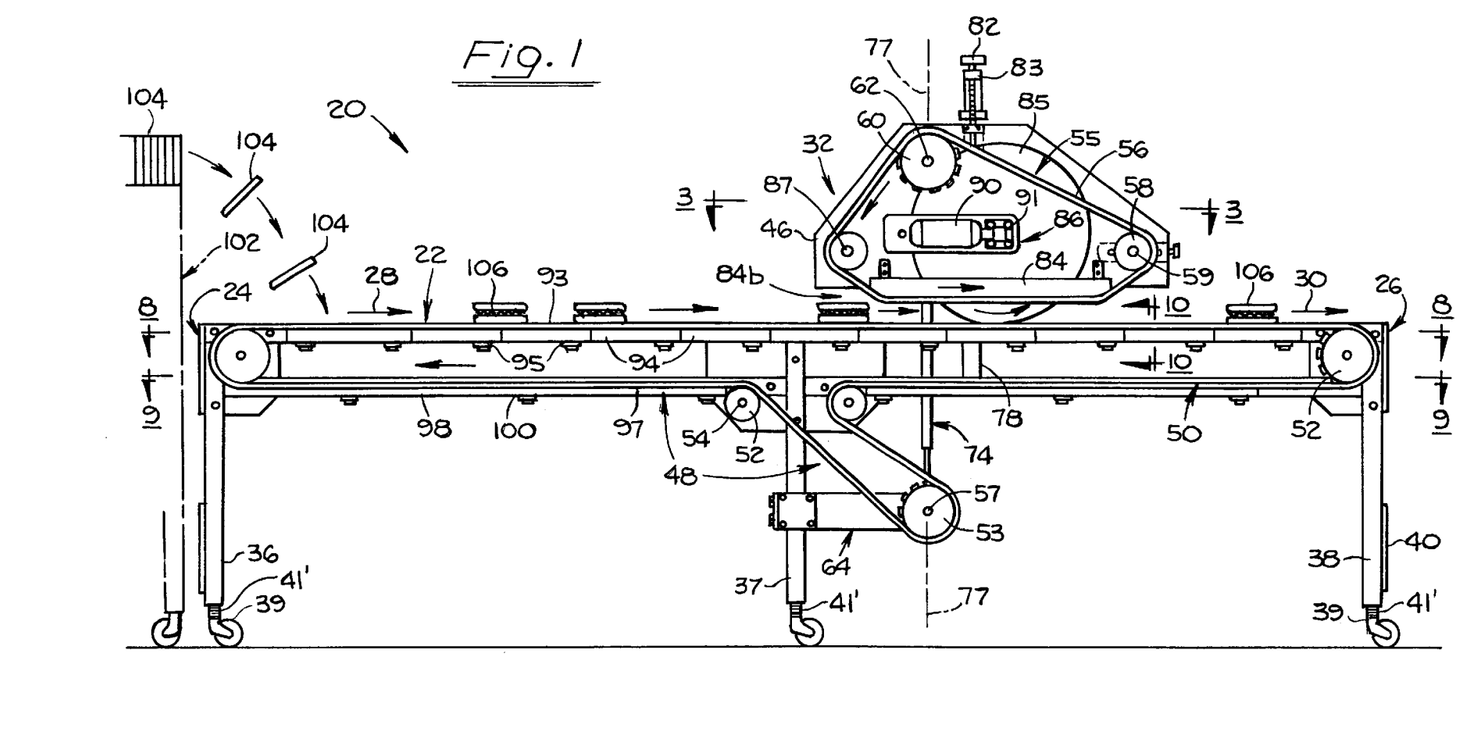
FIG. 1 is a vertical, longitudinal, sectional view of the frame of the machine.

The sandwich machine is shown in its entirety at 20, FIG. 1 showing the principal parts thereof. It includes a main frame indicated at 22 extending the full length of the machine, having a front end 24 and a rear end 26, the sandwich parts being introduced at the front end as indicated by the arrow 28, and carried therethrough to the right (FIG. 1) where the completed sandwiches leave the machine as indicated by the arrow 30. Mounted on and positioned above the main frame is a slicer carriage or unit 32.

The main frame 22 (FIG. 1A) includes a pair of vertically spaced, longitudinally extending side rails 34 at each side of the machine extending throughout the length of the machine. Supporting legs 36, 37, 38 are provided at the front, middle, and rear of the main frame and vertically spaced end plates 40 are secured to the rails and legs at the ends of the frame, extending across the frame. Suitable casters 41 may be provided on the legs. The machine is adapted to be made in quite long lengths, even in shorter sections connected end to end, and in many locations in which it may be used, the floor is uneven. Therefore, these casters are provided with threaded stems 41' for adjusting them to proper height for accommodating an uneven floor. The stems are preferably provided with locking means of know kind.

Figure 1A:
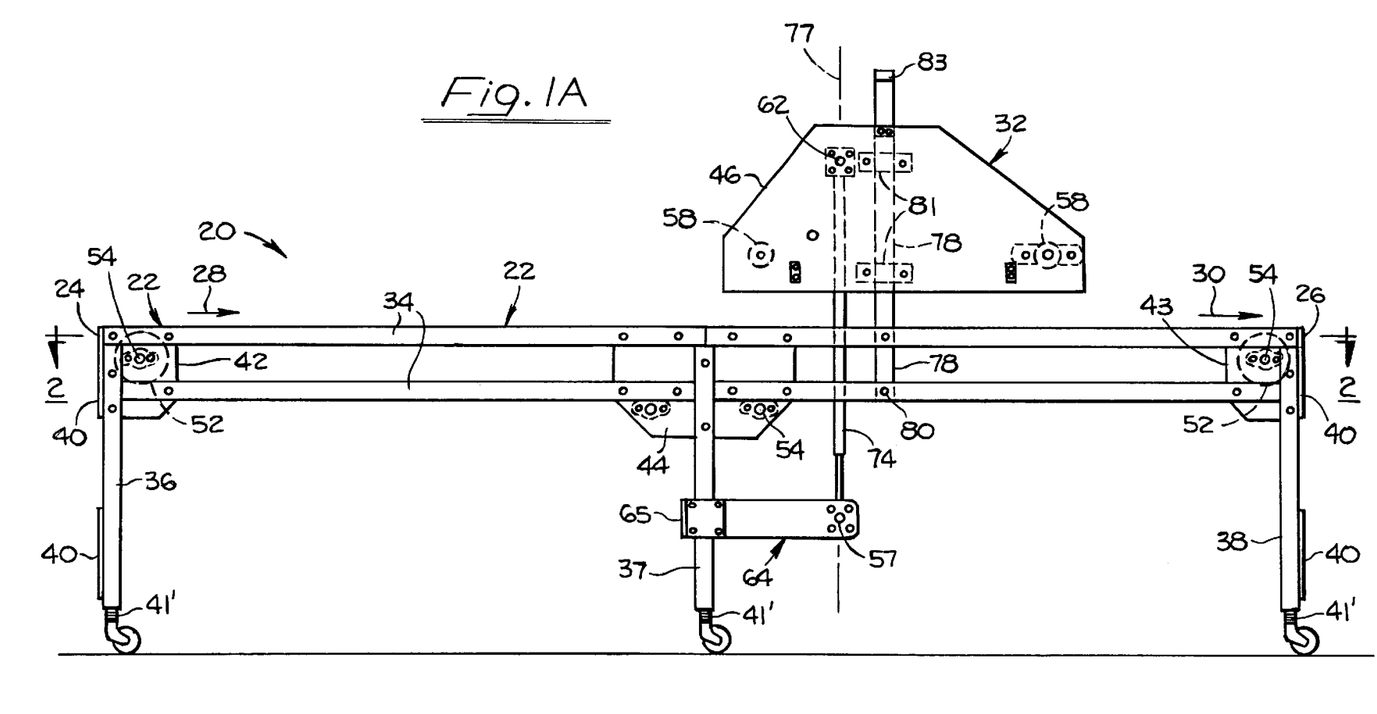
FIG. 1A is a view similar to FIG. 1, without the conveyor belt, and showing more structure of the frame.

End truss plates 42, 43 are also secured to the rails and legs at the sides of the frame, covering the ends of the idler rollers 52 at the ends of the machine. The machine may be of any length, within practical limits, to accommodate various capacities of the machine, and in providing relatively long lengths, the rails may be secured together by middle truss plates 44 which are also secured to the middle legs 37.

Figure 3:
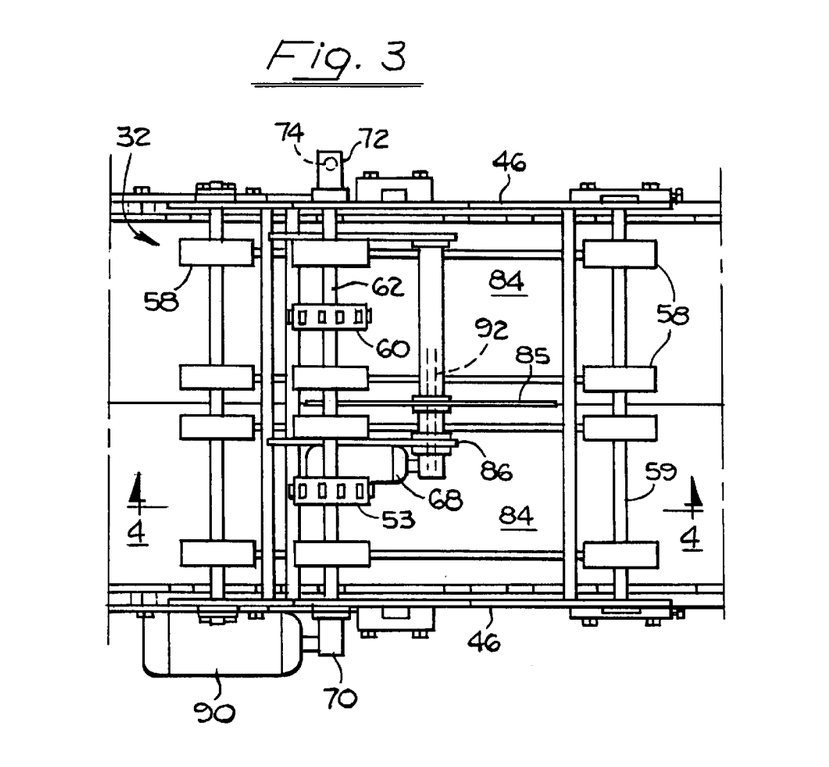
FIG. 3 is a top view of the central portion of the machine as shown in FIG. 1, and without certain of the operating parts.

The moving operating parts in the machine, supported by the main frame, will be described in detail, but it is here pointed out that the slicer carriage or unit 32 includes side plates 46 (see also FIG. 3).

The machine is provided with an endless main belt 56, (FIGS. 1 and 4) trained on idler rollers 52 at the ends of the frame, and idler rollers 52' at the middle, mounted on respective idler rods or shafts 54. The main belt is also trained on drive rollers 53 (FIG. 1, middle, bottom). The idler rods 54 at the ends are mounted in the end truss plates 42, and the idler rods 54 in the middle are mounted in the middle truss plates 44.

Figure 4:
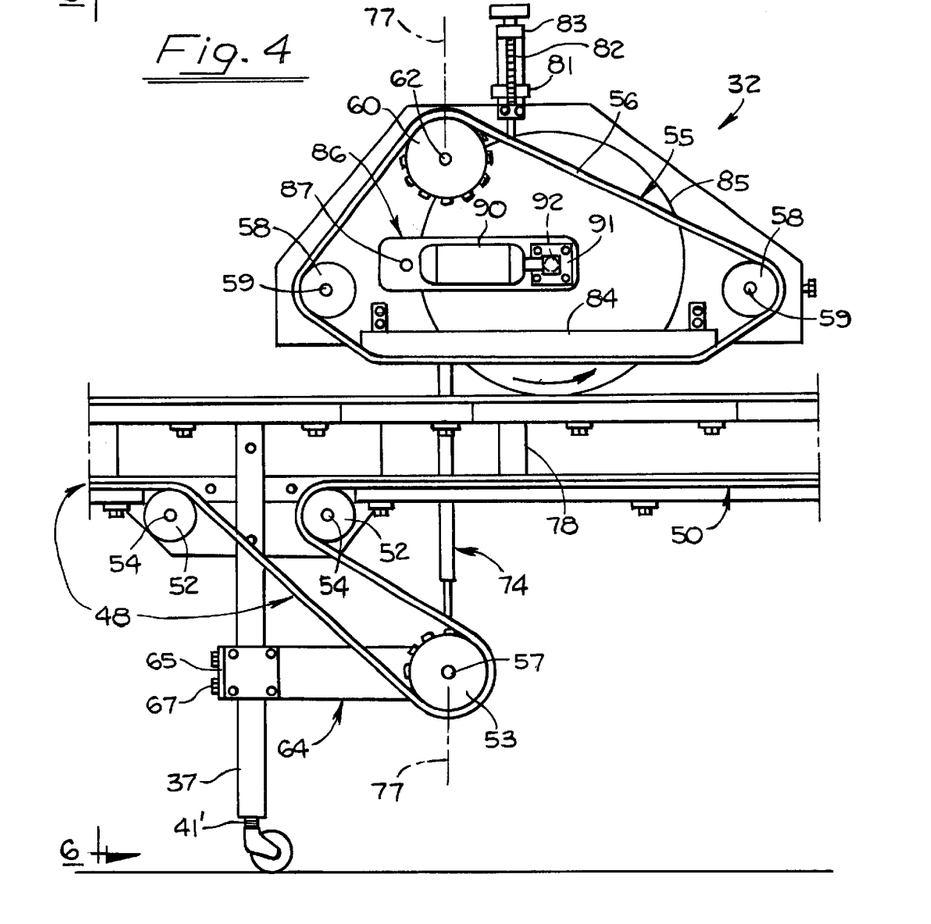
FIG. 4 is a view taken at 4—4 of FIG. 3.

In the slicer carriage 32 is an endless slicer belt means 55 including a pair of transversely spaced belts 56, trained on idler rollers 58 mounted on idler rods 59. The belts 56 are also trained on a drive roller 60 mounted on a drive rod 62. In the slicer carriage 32, the idler rods 59 are mounted in the side plates 46.

The drive rollers 53 (FIGS. 1, 2, 6) are mounted on a drive rod 57, the latter being mounted at one end in a carriage 64 (FIGS. 1, 1A, 4), which is mounted on a cross member 65 mounted on the middle legs 37 and held in vertically adjusted position by suitable clamp means 67.

A variable speed electric motor 68 of known kind (FIGS. 2, 6) is mounted on the carriage 64 and operates through a right angle gear box 70 operably connected with the drive rod 57.

Figure 2:
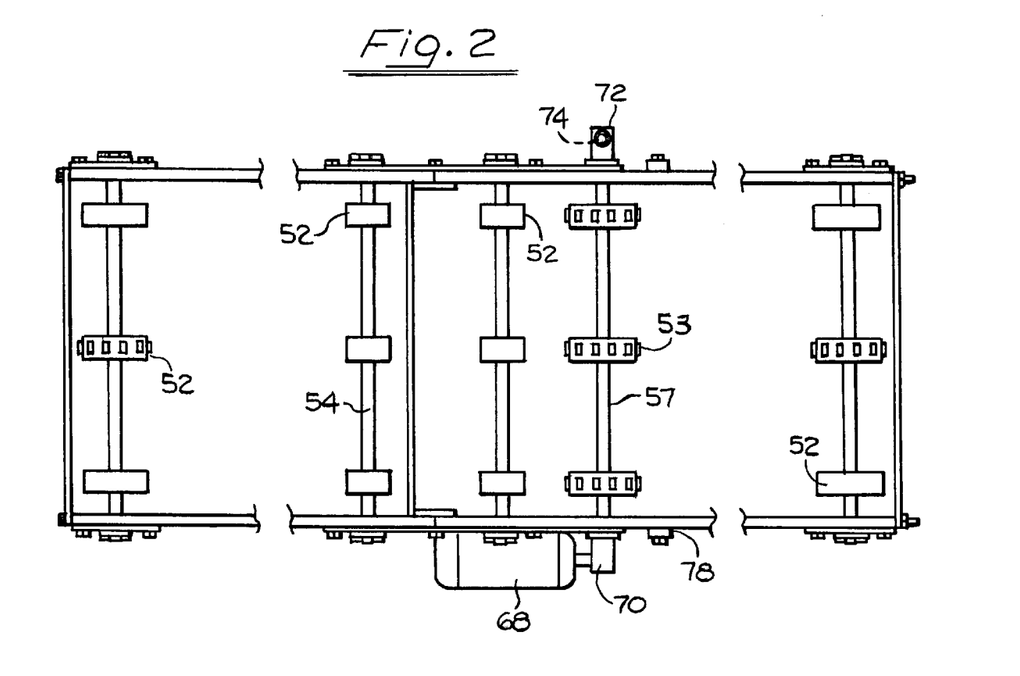
FIG. 2 is a horizontal view taken at 2—2 of FIG. 1A.
Figure 6:
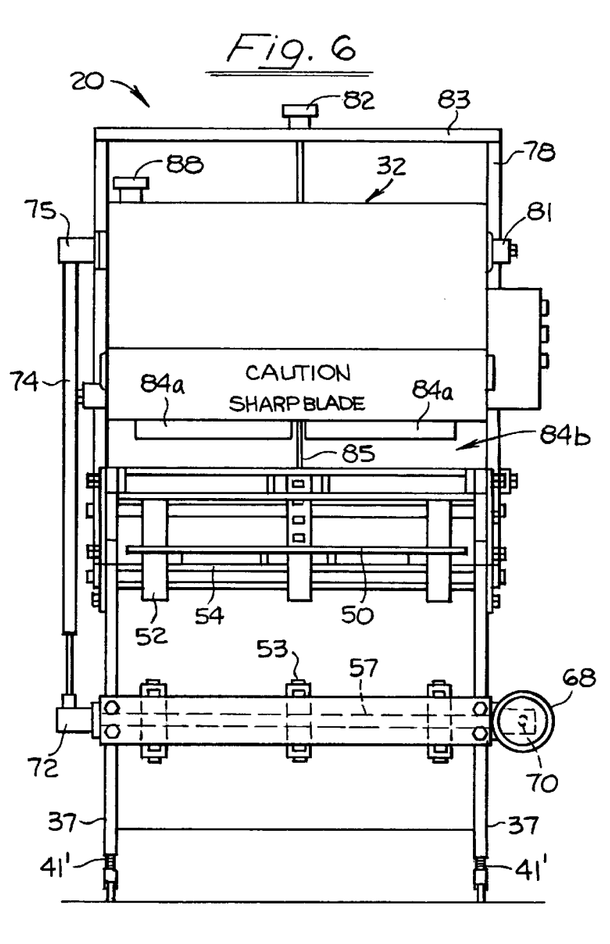
FIG. 6 is a view taken at line 6—6 of FIG. 4, with certain elements deleted.

At the opposite side of the machine (FIGS. 2, 3, 6) the drive rod 57 operates through a second right angle gear box 72 and operably connected with the latter gear box is a vertical telescoping drive rod 74 (FIGS. 2, 6). The telescoping drive rod 74 at its upper end is operably connected with still another right angle gear box 75 (FIG. 6). Leading from the gear box 75 is the drive rod 62 identified above on which the drive roller 60 (FIGS. 1A, 4) is mounted for driving the endless belt means 56 in the slicer carriage. Thus the two conveyor belts 50 and 56 are driven by a common drive means and the elements of the drive are such that the linear rates of speed of these two conveyor belts are synchronous and equal. The axes of the belts are parallel.

The slicer carriage is adjustable vertically as described below, and to accommodate such vertical movement of the carriage, the telescoping drive rod 74 comes into play, accommodating different vertical distances between the drive rollers 53, 60. The telescoping drive rod 74 is of known kind, being made of slidable sections arranged in drive interengagement.

The adjustability of the carriage 64 (FIGS. 1, 4) effects tightening the endless main belt 50. It is to be noted that in this adjustment of the carriage, the drive rollers 53 remain in the same vertical line indicated at 77. In the vertical adjustments of the slicer carriage 32, as referred to below, the drive rod 62 and drive roller 60 also remain on this same vertical line 77.

Figure 7:
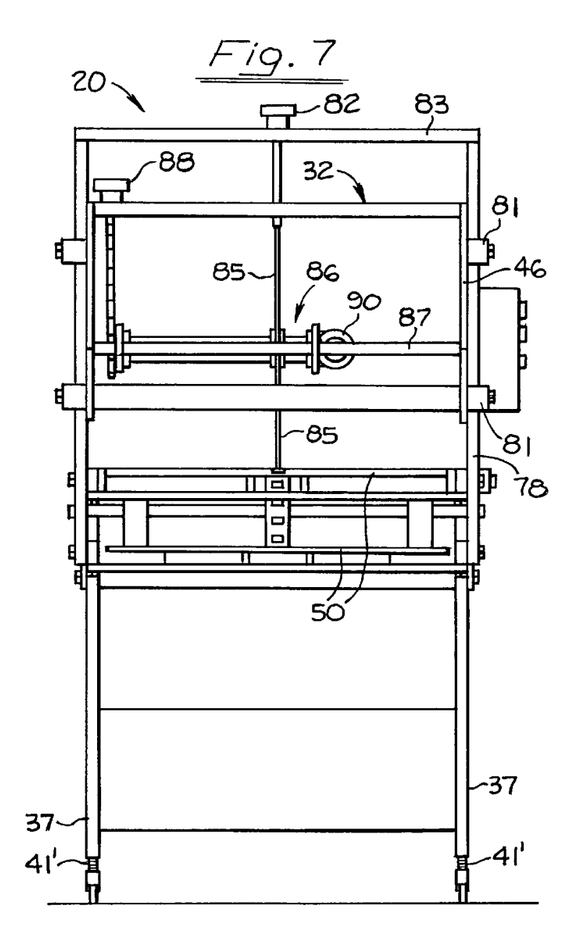
FIG. 7 is a view similar to FIG. 6 but showing additional elements.

The slicer carriage 32 (FIGS. 1A, 7) is slidably mounted on vertical supports 78 of rectangular tubing at the sides of the carriage and secured to the main frame as indicated at 80 (FIG. 1A), at points on both side rails, providing stability to the slicer carriage. The slicer carriage is so mounted by means of clamping units 81, and the user adjusts the height of the carriage by means of an adjustment screw 82 suitably mounted in a cross member 83 on the supports 78.

The slicer carriage also includes laterally spaced longitudinal horizontal strips 84 (FIG. 1) preferably of plastic, forming a space 84*a* therebetween. The slicer belt 56 rides under these strips, in engagement therewith, and that segment of the belt along the length of the strips is held in horizontal position in accurate parallelism with the main conveyor belt for gripping the sandwiches as described below. A slicer space 84*b* is formed between the belts 56, 50.

Positioned in the slicer carriage is a rotatable circular slicer blade 85 mounted in a carriage 86 (FIG. 7) pivoted on a cross rod 87 (see also FIG. 1) supported in the side plates 46, of the carriage. This enables vertical adjustment of the slicer blade in the slicer carriage. The slicer blade is manually adjustable by means of an adjustment screw 88 having operable connection with the carriage 86.

The slicer blade 85 is driven by a variable speed electric motor 90 mounted on the carriage 86 and operating through a right angle gear 91 driving the drive rod 92 (FIG. 1), and thus the slicer blade.

The strips 84 in the slicer carriage (FIG. 6), are positioned on respectively opposite sides of the slicer blade and thus in register with the respective slicer belts 56, to enable the slicer blade to reach therethrough and into the space 84*b* between the belts 56, which may be referred to as a slicer space.

The endless belts 50, 56 are preferably of white food grade polypropylene, with a ¾" pitch, manufactured by Rainbow Ram. Each belt is made up of a series of longitudinally spaced segments, falling into a smooth outer surface when the belt is in straight longitudinal direction, while providing the desired flexing in passing around the rollers.

Figure 8:
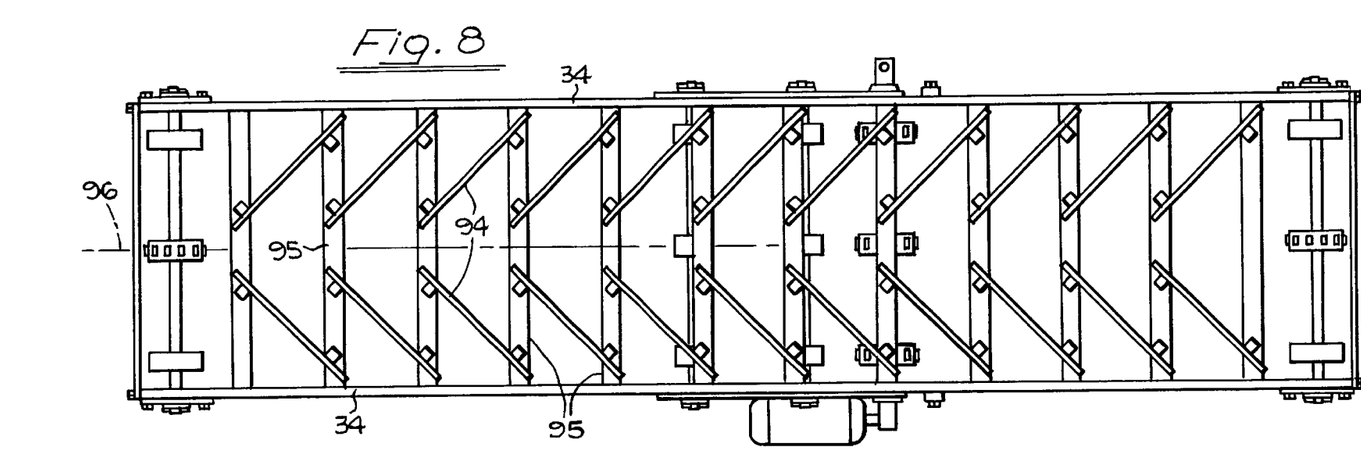
FIG. 8 is a horizontal view taken at line 8—8 of FIG. 1.

The support for the top run 93 of the main belt 50 is a grid work 93' made up of a series of diagonal strips, or herringbone strips, 94 (FIGS. 1, 4, 8) mounted on transverse flat strips 95. The strips are in two series, on opposite sides of the longitudinal center line 96 of the machine. The strips 94 are positioned on edge while the supporting strips 95 are positioned flat and secured to the under edges of the side rails 34 of the frame (FIG. 1A). These strips 94 are positioned relatively close together, and overlap as viewed transversely, progressing longitudinally of the frame, providing continuity so as not to leave any gaps between the strips in longitudinal direction. The upper run of the main belt imposes a considerable load, considering the weight of the conveyor itself and the sandwiches, and the action of the operators in handling the sandwiches, as well as the action of the slicer blade 85, but the continuity of the strips 94 longitudinally provides strong support for the belt.

Figure 5:
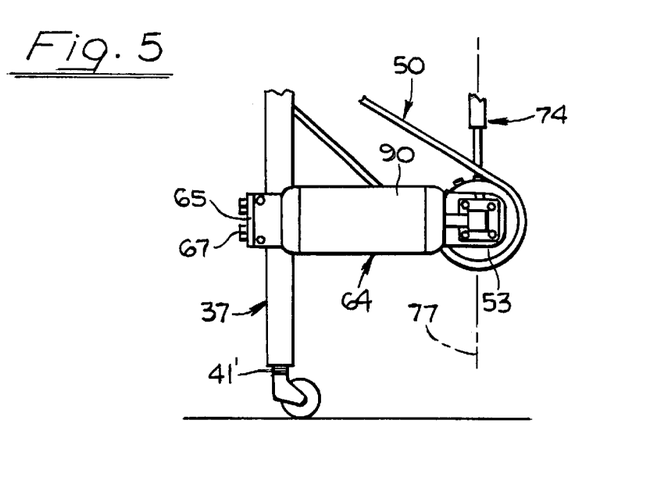
FIG. 5 is an enlarged view of the part enclosed in dot-dash line rectangle 5 of FIG. 4, and showing additional elements.
Figure 9:
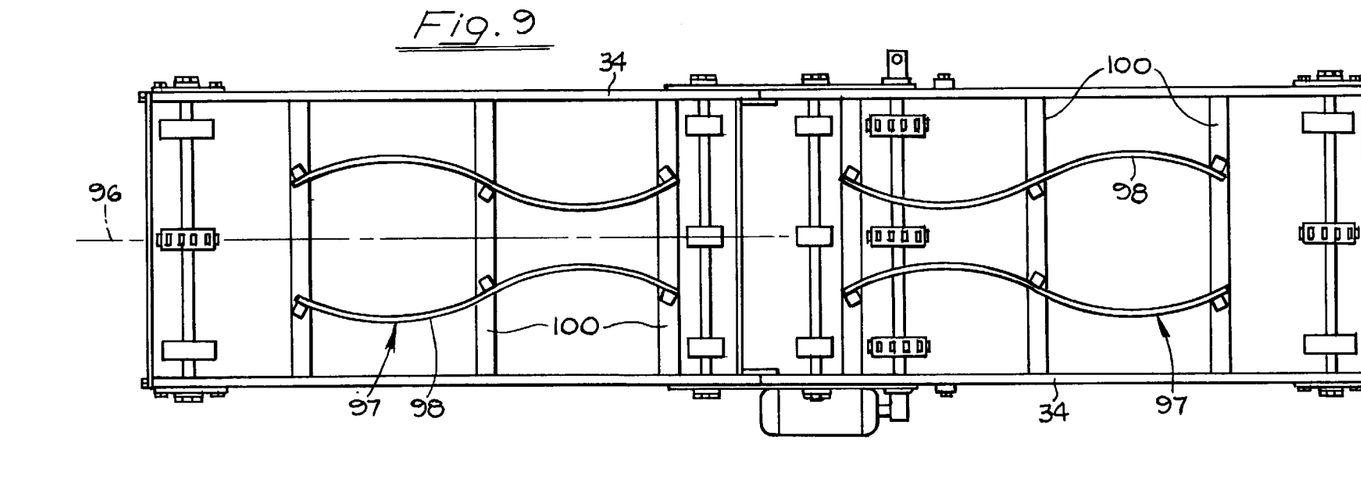
FIG. 9 is a horizontal view taken at line 9—9 of FIG. 1.

The lower run of the main conveyor belt 50 is supported by a grid work shown in FIG. 9 which includes bowed strips 97 which are in two groups spaced longitudinally to accommodate the lower extension of the belt (FIGS. 4, 5). Each group includes opposed double-curved strips 98, extending generally longitudinally of the machine, and supported by a series of longitudinally spaced transversely extending flat strips 100, the latter being secured to the under edges of the lower side rails 34 of the frame. The lower run of the belt is not subjected to such forces as is the upper run. The strips 98 are curved throughout their lengths without any longitudinally straight portions.

The sandwich machine may be used in connection with a feeder 102 as indicated diagrammatically at the left in FIG. 1. On the feeder is a quantity of bread slices 104 that are delivered therefrom onto the main conveyor belt 56, either manually or automatically. As they progress forwardly as indicated by the arrow 28, operators put them in sandwich form, i.e. the slices are fitted together with filler substance therebetween. The sandwiches 106 thus formed progress along the conveyor belt 50, and pass through the slicer space 84*b* between the main conveyor belt and the slicer conveyor belt 56. As noted above, the slicer carriage is pre-set vertically, to provide such space 84*b* of the desired dimension to frictionally grip the sandwiches as they are carried therethrough, to the right in FIG. 1.

As the sandwiches pass through the slicer space 84*b*, the slicer blade 85, having been pre-set to a desired position, cuts through the sandwiches and cuts them into two pieces. The slicer blade preferably is so rotated that its periphery moves in the same direction as the sandwiches, i.e. counterclockwise as viewed in FIGS. 1 & 4. This makes a clean cut through the sandwich, since the belts grip the sandwiches and prevent them from being displaced in that step, making an accurate cut.

Figure 10:
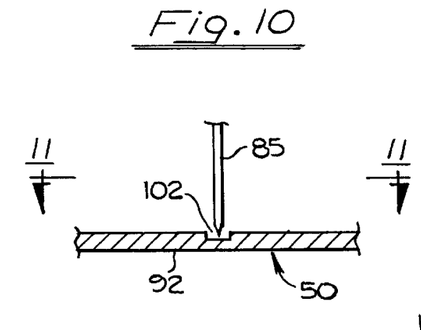
FIG. 10 is a fragmentary sectional view taken at line 10—10 of FIG. 4.
Figure 11:
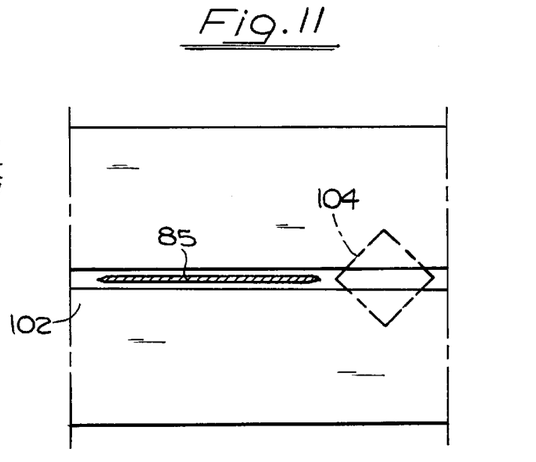
FIG. 11 is horizontal view taken at line 11—11 of FIG. 10.

As an additional feature for making an accurate cut through the slices, the main belt 50 (FIGS. 10, 11) is provided with a longitudinal groove 107 into which the slicer blade moves as it is adjusted downwardly. This produces a cut entirely through the sandwich, producing a smooth cut without jagged edges.

The groove also provides a guiding line (FIG. 11) for the operators to place the sandwiches (FIGS. 11, 14) in position for cutting at the proper location and in the desired direction. The sandwich is shown disposed diagonally, relative to the line, in this case, but they may instead be put in other positions if desired.

Figures 12, 13:
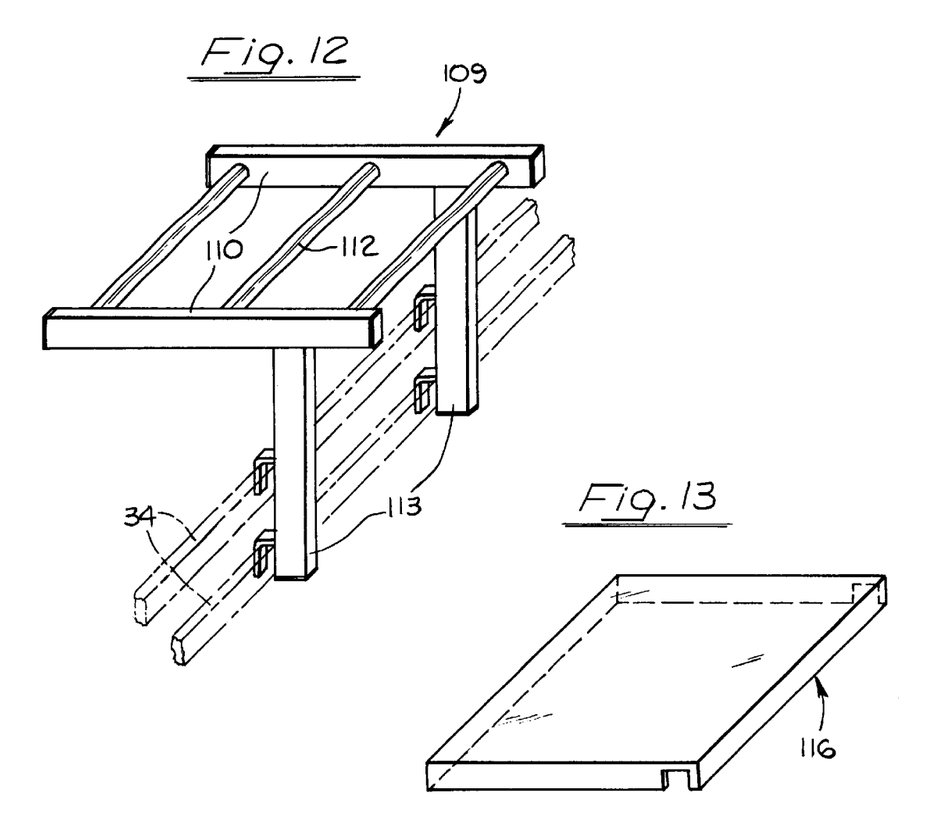
FIG. 12 is a perspective view of a rack that is detachably mounted on the frame.
FIG. 13 is perspective view of a tray to be used with the rack in FIG. 12.
Figure 14:
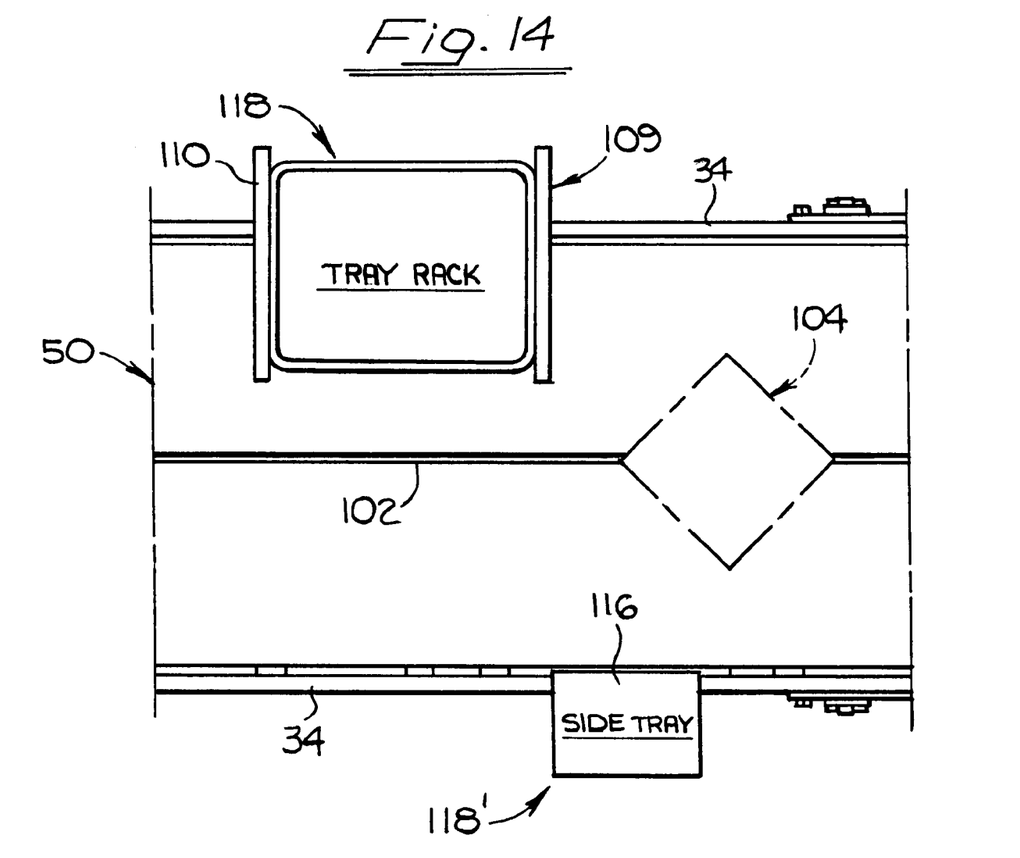
FIG. 14 is a horizontal view of the left hand portion of the machine showing a rack and tray detachably mounted on the machine.

Attention is next directed to FIGS. 12, 13, 14 showing a tray rack and tray for mounting on the frame. In FIG. 12 the tray rack 109 includes spaced cross bars 110 extending between which are rods 112 forming a platform. Extending down from the side bars are legs 113 on which are mounted hooks 115 for hooking over the side rails 34 of the frame. The hooks include two on each leg for engaging respective ones of the two vertically spaced rails 34.

The tray rack is mounted on one side of the main frame as shown in FIG. 14 and its inner end extends over the conveyor to a convenient extent, and thereby accessible to operators on both sides of the machine.

FIG. 13 shows a tray 116 that is placed on the rods 112 of the tray rack (FIG. 12). A quantity of pre-loaded trays are provided, the parts for the sandwiches being stacked on the trays, and the operators take off those parts as needed to form the sandwiches as the parts move along on the conveyor.

A plurality of side trays may be provided and spaced conveniently along the machine. They are readily detachable, and can easily be placed at any convenient location. Additionally the tray racks may be of different sizes to hold different size trays as shown at 118, 118' in FIG. 14.

All parts of the machine, including the electric drive motors are of wash-down character, and the entire machine may be washed down while it is running.

What is claimed is:

1. A sandwich machine comprising,
    a main frame forming a stand including a pair of vertically spaced rails at each side of the machine and extending the full length of the machine,
    the rails supporting detachably connected transverse strips,
    the stand including legs at the ends and at least one intermediate location therebetween,
    a self-contained slicer unit above the main frame,
    the slicer unit including side plates rigidly connected together,
    a main conveyor including an endless main belt,
    a slicer conveyor including a pair of endless slicer belts,
    means for supporting the slicer unit above the main frame with the axes of the two belts parallel, and so mounting the slicer unit for straight-line vertical adjustment in position forming a slicer space between the two belts,
    the slicer unit including straight, longitudinal strips engaged by the lower run of the slicer belts operable for retaining the slicer space in a pre-set dimension,
    common drive means for driving the two conveyors at the same linear spread with the adjacent runs of the two conveyors running in the same direction.
    a vertical rotary slicer blade in the slicer unit located between the pair of endless slicer belts operable for slicing sandwiches on the main conveyor, and
    second driving means in and carried by the slicer unit for driving the rotary slicer blade.

2. A sandwich machine according to claim 1 wherein, the common drive means is mounted on at least one of the legs at the intermediate location.

3. A sandwich machine according to claim 1 wherein, the transversely extending strips including preselected lengths of the frame, and
thereby pre-determining the position of the central legs and common drive means, and the slicer unit therewith, at different positions between the end legs.

4. A sandwich machine according to claim 3 wherein, the transversely extending detachably interconnected strips, thereby enabling a preselected number of strips to form the conveyor, within a range of numbers of the strips to form a selected length of conveyor, and
the sandwich machine includes manually actuated means for tightening the main conveyor.

5. A sandwich machine according to claim 4, wherein, the main conveyor belt includes a longitudinal groove therein,
whereby the slicer blade is capable of slicing entirely through sandwiches on the main conveyor and enter into the groove without engaging any of the parts or elements of the main conveyor belt.

6. A sandwich machine according to claim 5 wherein, the slicer blade is adjustably movable vertically in and reative to the slicer unit, to pre-determine the extent the slicer blade enters the groove in the main belt.

7. A sandwich machine according to claim 6 wherein, the means for supporting the slicer unit includes a pair of longitudinally spaced vertical bars at each side of the frame adjustably secured to both of the side rails at the corresponding sides of the main frame.

\* \* \* \* \*